United States Patent Office 3,470,962
Patented Oct. 7, 1969

3,470,962
ROTOR HEADS FOR ROTARY WING AIRCRAFT
Ronald William Lewis Cure, Yeovil, England, assignor to Westland Aircraft Limited, Yeovil, England
Filed Jan. 12, 1968, Ser. No. 697,383
Claims priority, application Great Britain, Feb. 7, 1967, 5,911/67
Int. Cl. B63h *1/06, 5/12*
U.S. Cl. 170—160.53              5 Claims

ABSTRACT OF THE DISCLOSURE

A rotor head assembly for rotary wing aircraft having opposing rotor blades coupled together by flexible members connected to universal bearings. One or more of these bearings are made to slide axially within the hub assembly. By this means the centrifugal forces on the hub and rotor blades are substantially balanced, and a simplified articulated rotor head, comparatively light in weight, minimum servicing, and an extended overhaul life, has resulted.

---

This invention has reference to rotors for rotary wing aircraft of the kind in which the pitch of the rotor blades is adjustable cyclically or collectively during the rotation of the rotor, and provision is also made for the lead and lag movements of the blades.

Most of the prior rotor heads and those in current use utilise fully articulated or semi-rigid arrangements for attaching and interconnecting the rotor blades in the hub, but with prior arrangements, of which we are aware, there are disadvantages, in particular the high centrifugal loads imposed upon the hub, in which the blades are individually attached, and also on the root end bearings of the blades. A further complication is the provision of flapping and drag hinges with their attendant dampers.

It is an object of this invention to overcome some of these disadvantages by means of coupling opposing rotor blades together through the rotor hub, so that the centrifugal loads are cancelled and the only loads remaining on the hub will be those of torque, lift, thrust and other out-of-balance forces, caused by aerodynamic loads on the blades.

It is a further object of the invention to produce a simplified articulated rotor head which is comparatively light in weight, requires the minimum of servicing, and allows an extended time period between overhauls.

According to the invention we provide a rotor head assembly for rotary wing aircraft comprising a rotor hub wherein opposing rotor blades are coupled together by flexible members connected to universal bearings, at least one of which is axially slidable within the hub assembly.

According to a further aspect of the invention we provide a rotor head assembly for rotary wing aircraft comprising a rotor hub, at least one pair of diametrically disposed flexible tie members carried by said hub portion, said pair or pairs of tie members being within the same vertical plane but spaced apart from each other to form upper and lower members, the ends of said tie members being connected to rotor blades by way of spherical joint means so that, in rotation, the centrifugal forces on said hub and blades are substantially balanced, and bearing means within said hub to locate one of said spherical joints, whilst its opposite and opposing joint is free to slide axially within the hub portion.

According to a further feature of the invention, we provide a rotor blade assembly as set forth in the preceding paragraph, wherein pairs of diametrically opposed laminated flexible tie members are arranged to connect opposite and opposing rotor blades, said pairs of tie members being disposed substantially at 90° to each other, one of said pairs of tie members disposed within said hub on a higher or lower horizontal plane than the other pair or pairs.

Figure 1:
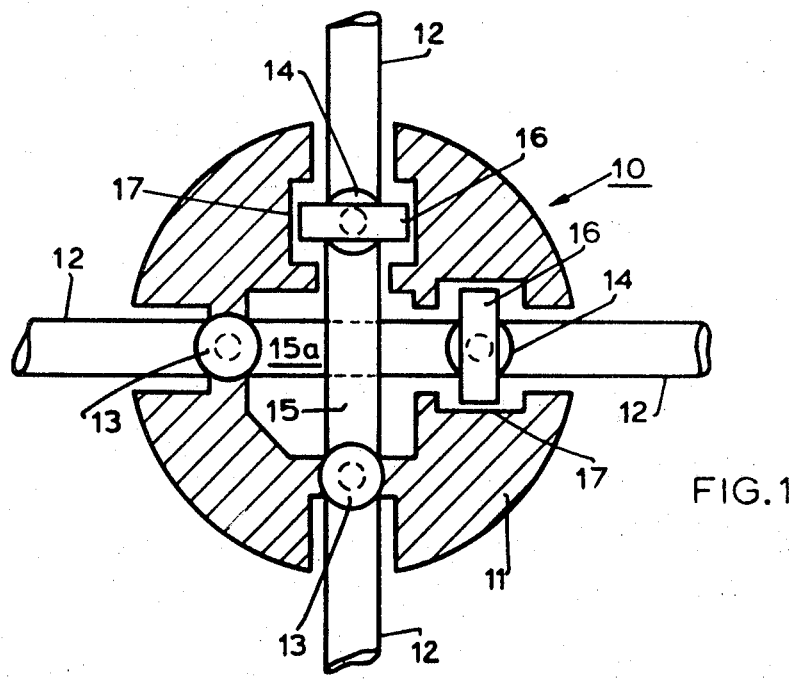
Figure 2:
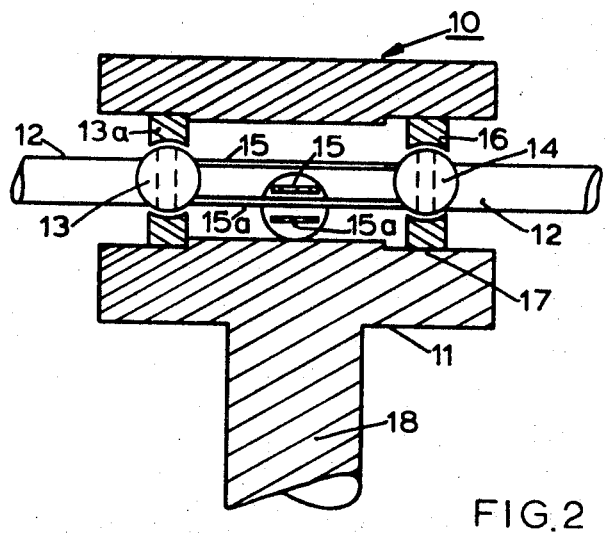

One embodiment of the invention will now be described, with reference to the accompanying drawings, in which:

FIGURE 1 is a sectional plan of the rotor head showing how the fixed spherical bearings and the sliding spherical bearings are retained in the rotor hub, and how the blades are interconnected by the tie members, and FIGURE 2 is a simplified vertical section through the hub, showing how the tie members are disposed between the bearings in a four-bladed rotor system.

Referring to the figures, the numeral 10 depicts a rotor hub assembly generally indicated, 11 depicts the hub casing which in practice would be made up from at least two parts and would, for preference, be split along the horizontal centreline so that easy assembly is possible. FIGURE 1 illustrates the preferred arrangement of a four-bladed rotor hub, the actual rotor blades of which are not shown, but the root end members 12 to which the blades are attached are connected to spherical bearings 13 and 14 housed within the hub 10. The spherical bearings 13 and 14 each comprise two convex shell members (not shown) which are connected to each other by means of a bolt (not shown), which also forms a pivotal connection for the blade root end members 12. Each blade root end member 12 is flexibly connected via the bolt in the spherical bearing to its opposite blade root end member 12 by means of two pairs of laminated steel retaining straps 15 and 15a. These straps are spaced apart, one above the other, forming upper and lower members which carry part or all of the centrifugal loads imparted by the rotating blades, thus relieving the rotor hub 10 of these forces. The two pairs of retaining straps 15 are offset vertically, to provide clearance at the centre of the hub, and hence the opposite pairs of rotor blades themselves are offset. The hub casing 11 is split and bolted together on the horizontal centreline, in order to house the dry spherical bearings 13 and 14, which permits low stiffness in flap, thereby avoiding high bending stresses. One spherical bearing 13 is located in the hub casing 11 by the concave portion 13a of the spherical joint, while the other bearing 14 is free to slide axially. This is achieved by enclosing the spherical bearing 14 in a member 16, which can slide within the recessed portion 17 in the casing 11. These spherical bearings 13 and 14 also act as dry bearing lead/lag hinges which provide their own friction damping. However, lubrication and other means of damping may be provided, if required.

The lower half of the hub casing 11 incorporates a circular drive shaft 18 which is bolted to the rotor gearbox. Each root end blade member 12 is provided with a pitch change arm (not shown), and also a two-pin yaw (not shown) for blade attachment and folding. A strut or stop (not shown) is provided on each of the lower retaining straps 15a, in order to carry compressive loads in the static droop condition of the rotor blades.

In operation of the invention it will be appreciated that the spaced flexible retaining straps 15 and 15a, in the coning plane, are virtually rigid and the bending moments are carried as differential end loads in the straps. In consequence, in the coning plane, the blades act in a similar way to the rigid motor. However, when operating in the flapping sense, that is to say when one blade is moving upwardly or downwardly and its opposing blade is moving in the opposite direction, differential twisting of the straps 15 and 15a occurs at a point adjacent to the spherical bearings 13 and 14. This twisting movement incurs a shortening of the straps and must be allowed for by provision of the sliding spherical bearing 14. Resistance to bending is low in the flapping sense when the assembly behaves as an articulated rotor.

When cyclic pitch is applied by the pilot no twisting of the retaining straps 15 and 15a occurs, as each pair of blades, root end members 12, and straps 15 and 15a will turn together in their respective spherical bearings, and on rotation the pitch on one blade will be positive whilst that on the opposing blade assumes a negative angle. When collective pitch is applied the retaining straps 15 and 15a on both pairs of blades will be twisted to assume a positive angle. Lead and lag movements of the blades are controlled by friction in the dry spherical bearings 13 and 14.

When rotating, the centrifugal loads are balanced and each pair of blades is located axially by the bearing 13. Lift and thrust forces are transmitted to the hub through the spherical bearings. Torque is transmitted from the shaft 18 via the casing 11.

Having now described the essential features of the invention, and their co-operation, it will be appreciated that modifications are possible without departing from the scope thereof. For example, several forms of spherical bearing and methods of attaching the blades and their retaining straps to the bearings could be achieved. It would also be possible to include wet lubrication for the bearings. Furthermore, the stresses imposed on the straps 15 and 15a can be controlled by varying the thickness of the laminations, and means such as radiused projections could be incorporated adjacent to the bearings 13 and 14, to control the bending of the straps in operation.

The particular embodiment of the invention described is related to a four bladed rotor head, but it will be seen by those skilled in the art that a similar arrangement could also be incorporated in a single, or multi-bladed, rotor head.

I claim as my invention:

1. A rotor head assembly for rotary wing aircraft comprising a rotor hub including opposed rotor blades, said blades being coupled together by flexible members connected to universal bearings, at least one of which is axially slidable within the hub assembly.

2. A rotor head assembly for rotary wing aircraft comprising a rotor hub, at least one pair of diametrically disposed flexible tie members carried by said hub portion, said at least one pair of tie members being within the same vertical plane but spaced apart from each other to form upper and lower members, the ends of said tie members being connected to rotor blades by spherical joint means, so that, in rotation, the centrifugal forces on said hub are substantially balanced, and bearing means within said hub, to locate one of said spherical joints while it sopposite and opposing joint is free to slide axially within the rotor hub section.

3. A rotor head assembly according to claim 2, wherein pairs of diametrically opposed laminated flexible tie members are arranged to connect opposing rotor blades, said pairs of tie members being disposed substantially at 90° to each other, one of said pairs of tie members being disposed within said hub on a higher or lower horizontal plane than the other pair.

4. A rotor head assembly according to claim 2, wherein said flexible tie members are arranged to connect opposing rotor blades, said tie members being disposed substantially at 60° to each other.

5. A rotor head assembly according to claim 2, wherein said flexible tie members are arranged to connect opposing rotor blades, said tie members being disposed substantially at 45° to each other.

References Cited

UNITED STATES PATENTS

| 2,146,367 | 2/1939 | Berliner | 170—160.53 X |
| 3,249,161 | 5/1966 | Schoenherr | 170—160.53 |
| 3,261,407 | 7/1966 | Culver et al. | 170—160.53 X |
| 3,228,481 | 1/1966 | Eldred. | |

FOREIGN PATENTS

| 512,772 | 10/1920 | France. |
| 675,377 | 5/1939 | Germany. |
| 642,206 | 7/1962 | Italy. |

EVERETTE A. POWELL, Jr., Primary Examiner

U.S. Cl. X.R.

170—106.58